Feb. 24, 1942.  J. SINKOVITZ ET AL  2,273,899
SHEET-DELIVERY MECHANISM
Filed April 2, 1938   10 Sheets-Sheet 10

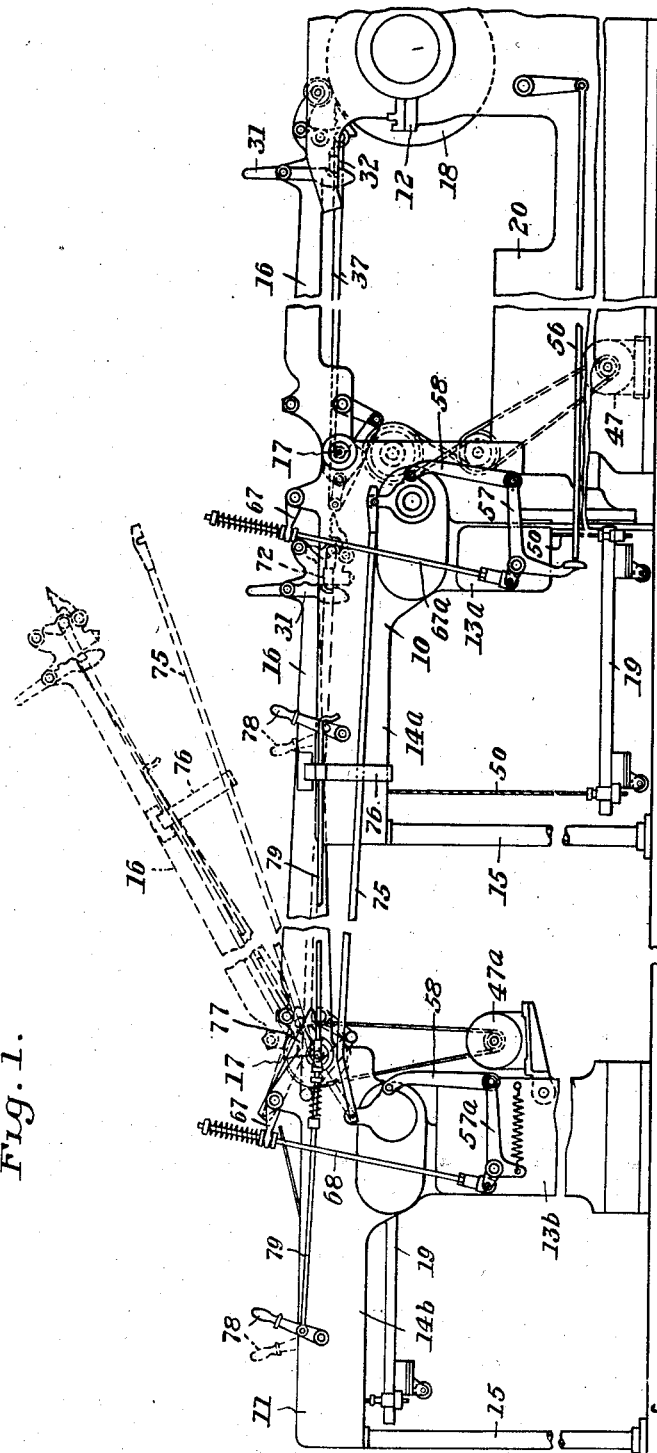

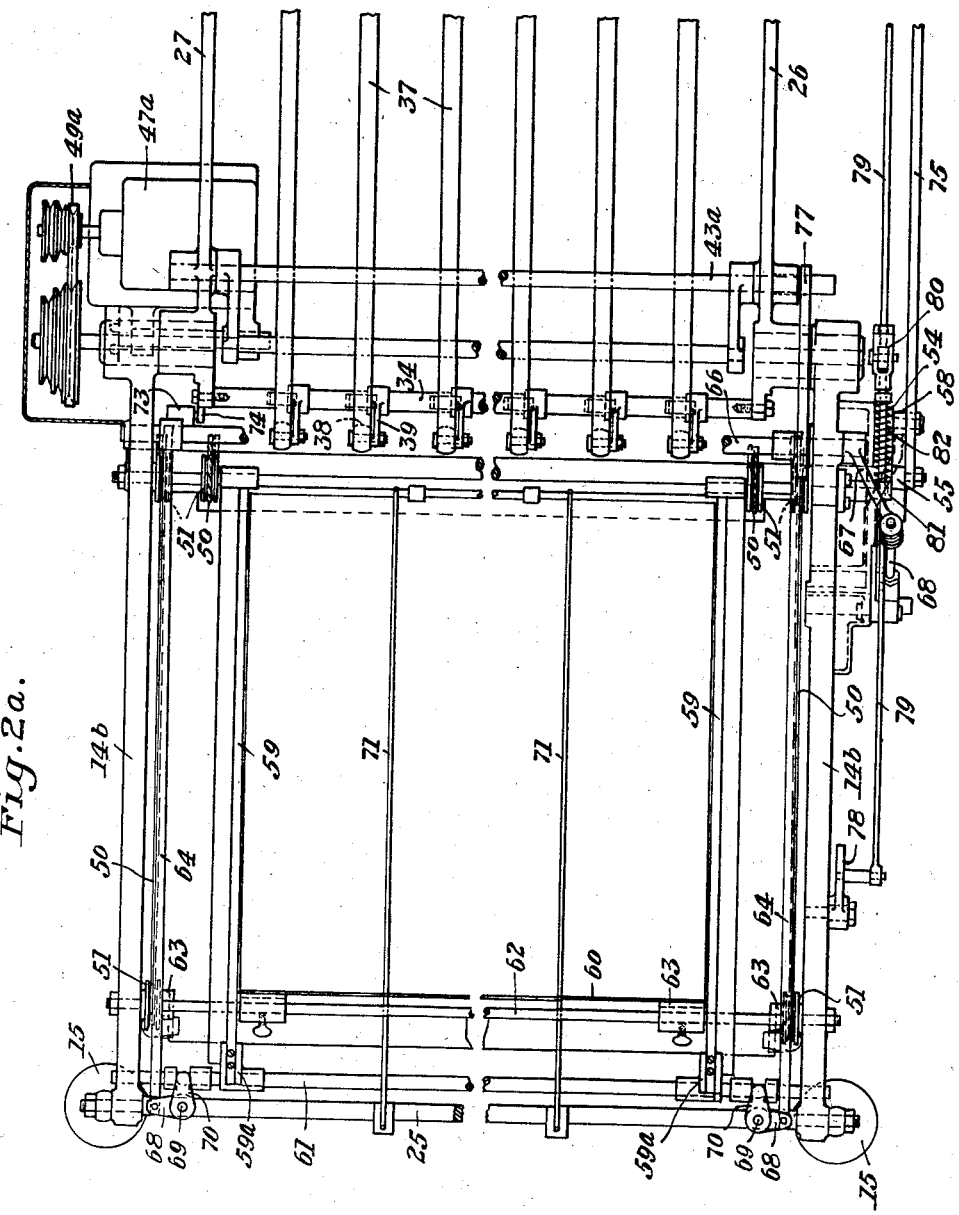

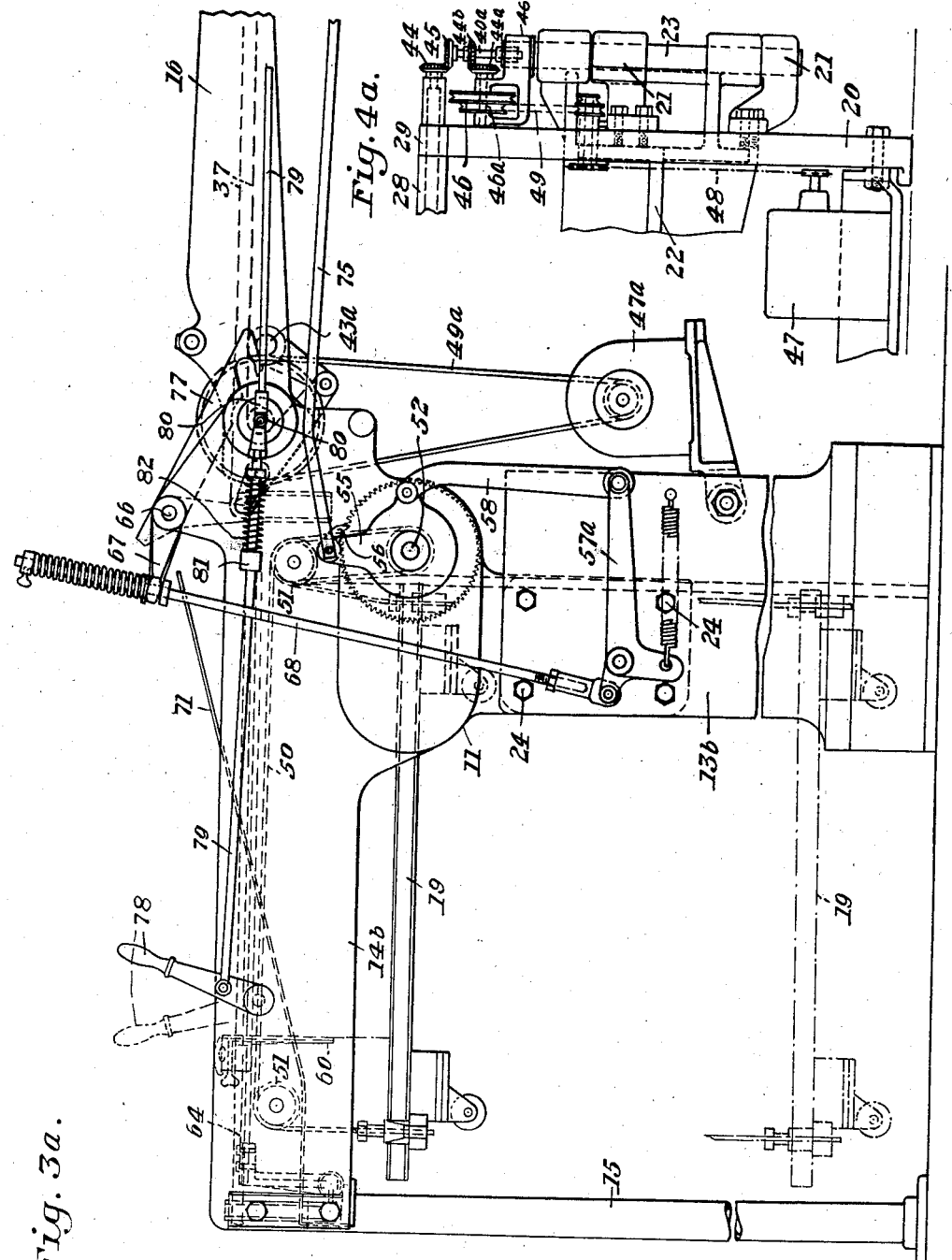

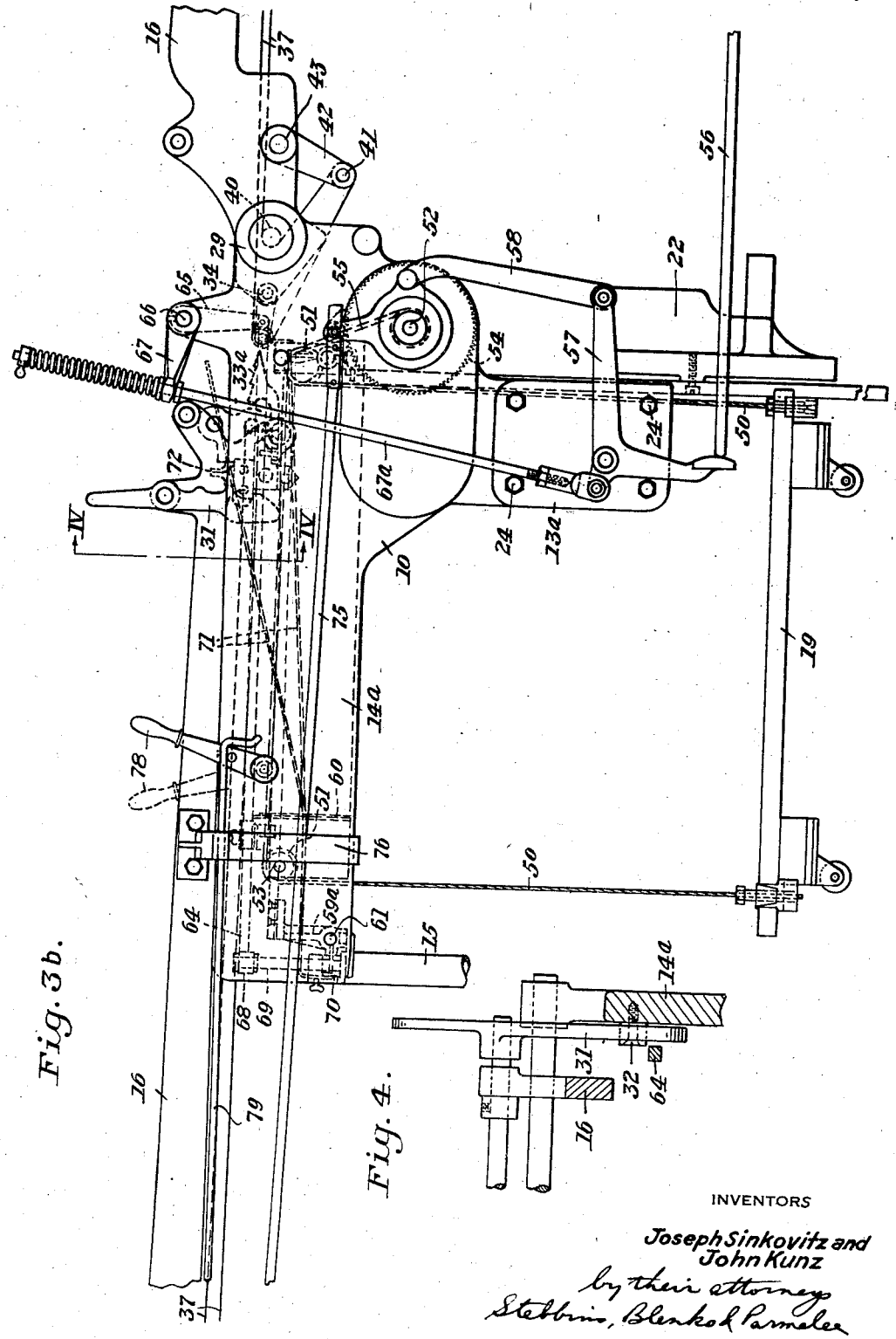

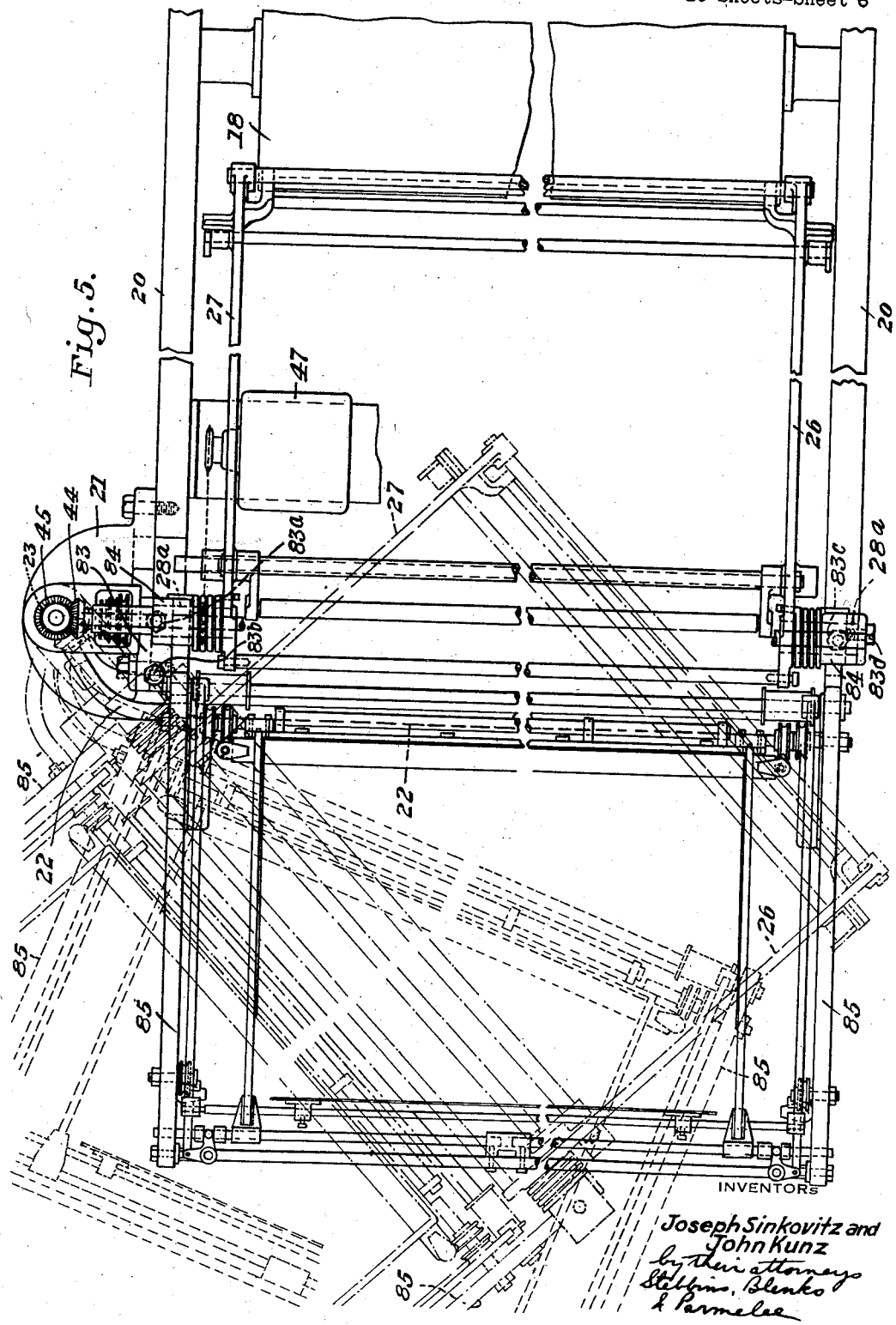

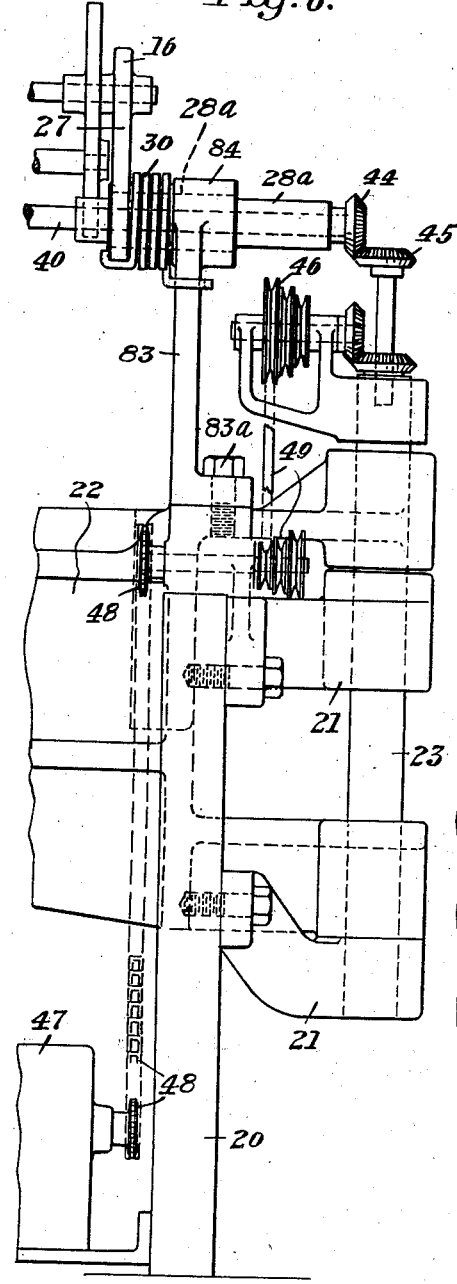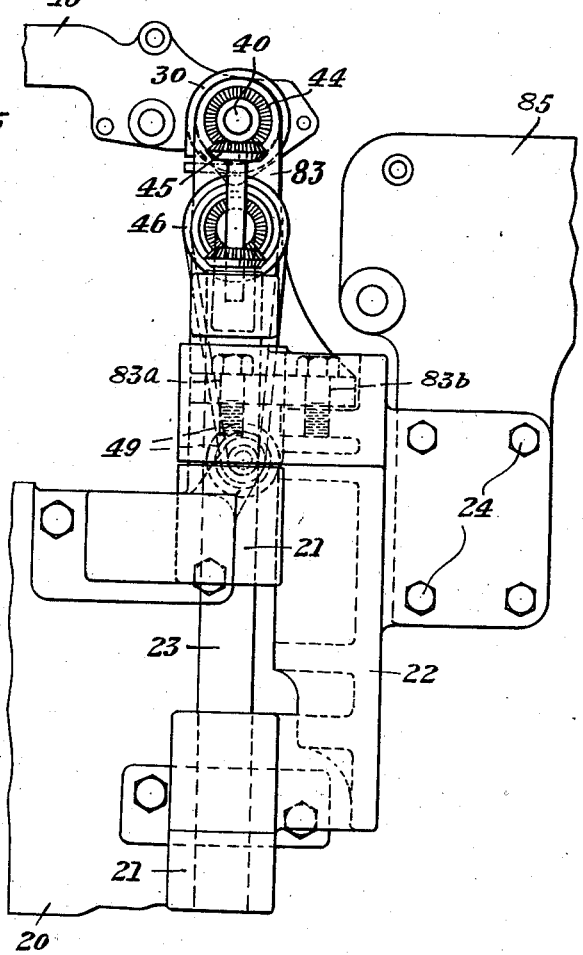

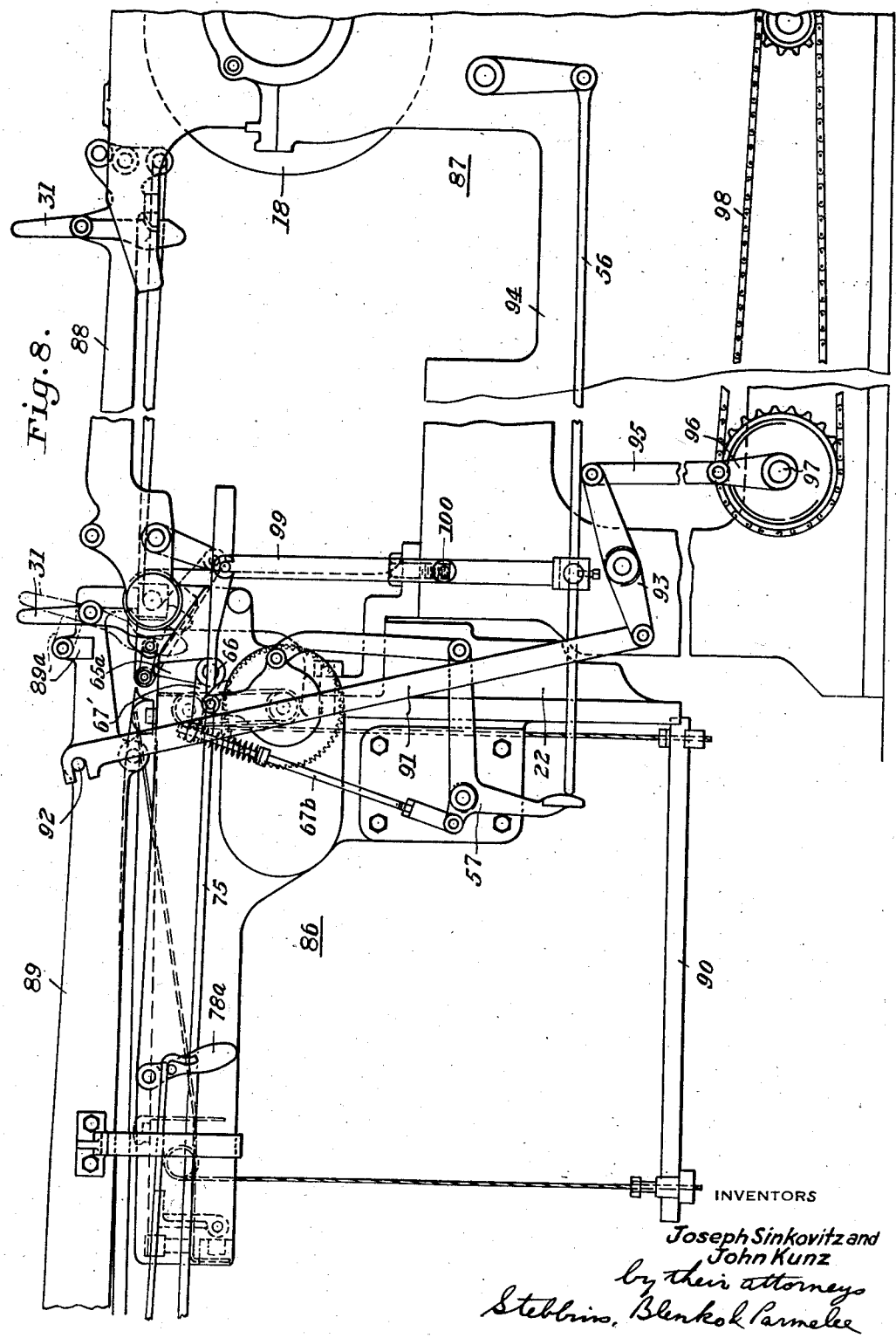

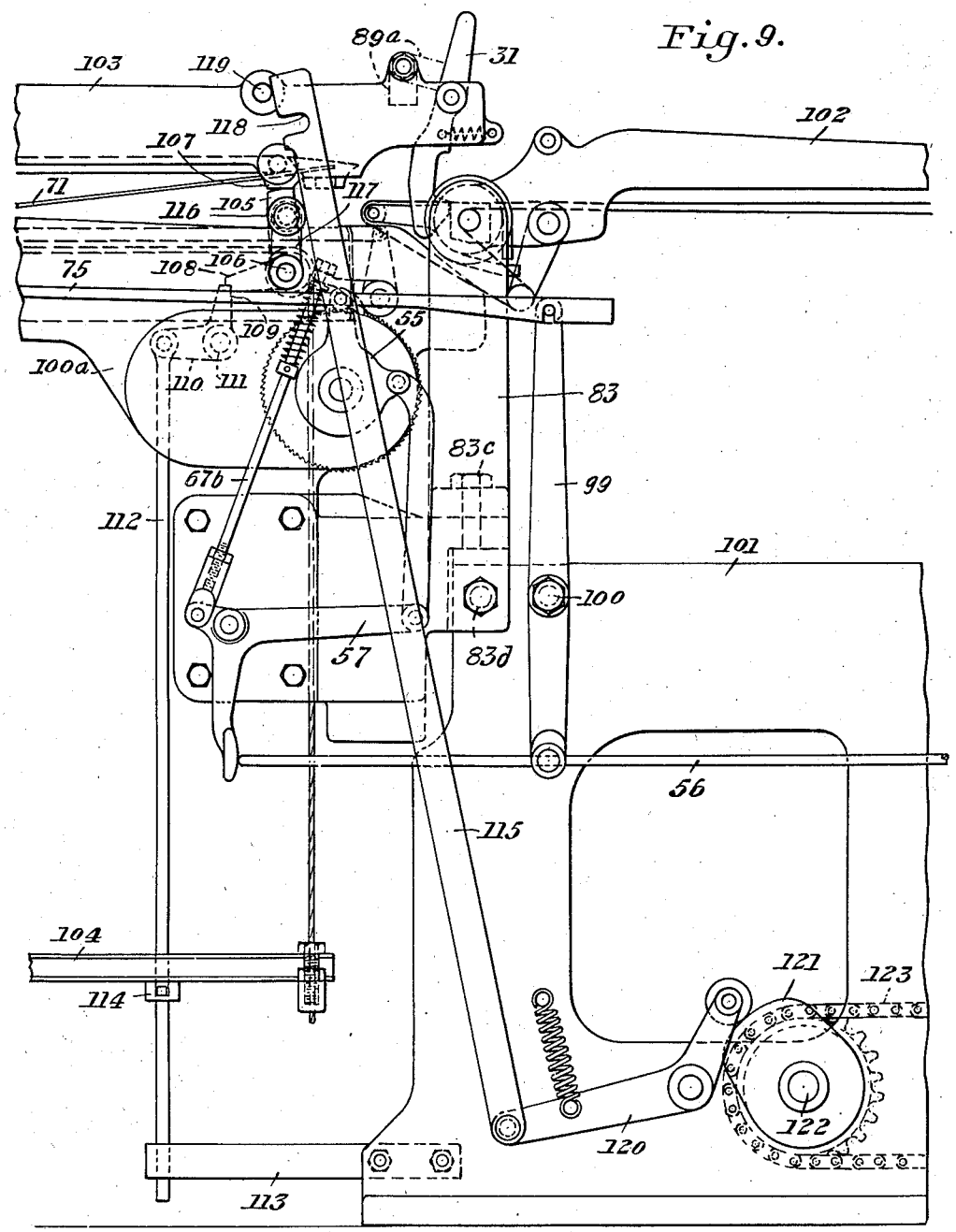

INVENTORS
Joseph Sinkovitz and
John Kunz
by their attorneys
Stebbins, Blenko & Parmelee Patented Feb. 24, 1942

2,273,899

UNITED STATES PATENT OFFICE 2,273,899

SHEET-DELIVERY MECHANISM

Joseph Sinkovitz and John Kunz, Pittsburgh, Pa., assignors to Miller Printing Machinery Co., Pittsburgh, Pa., a corporation of Pennsylvania Application April 2, 1938, Serial No. 199,657

14 Claims. (Cl. 271—64)

This invention relates to apparatus for delivering sheets from a processing machine where the sheets are operated upon individually, delivering them to desired points, and there stacking them neatly in piles. The apparatus has been devised for use with (and will herein be described in connection with) a printing press of the flat bed and cylinder type, although it may be applied equally as well to the delivery and piling of sheets discharged by any other type of processing machine.

In the delivery of sheets from a processing machine such as a printing press or the like, it is usually necessary to stop the machine for the removal of a pile of previously delivered sheets. This reduces the production obtainable from the machine. It is sometimes undesirable, furthermore, to deliver printed sheets from a press, one on top of the other, at frequencies which are easily attainable with modern presses, because of the danger of offsetting wet ink from one sheet onto the back of the next succeeding sheet.

We have invented a novel apparatus for delivering and piling sheets which overcomes the aforementioned objections and is characterized by numerous additional novel features and advantages which will become apparent as the following detailed description proceeds and will be particularly pointed out in the appended claims.

In a preferred embodiment of the invention, we provide a plurality of pile-supporting mechanisms with conveyor means whereby sheets delivered successively from a processing machine may be discharged onto a selected pile under the control of the operator. By means of the invention, it is possible to build up the piles in any desired order by delivering successive sheets to one or the other or by distributing the sheets among the several piles without stopping the delivery of successive sheets or otherwise interrupting the continuous flow thereof. We also provide means for automatically terminating the delivery of sheets to a given pile when it has reached a predetermined height. A preferred form of the invention with certain modifications is illustrated in the accompanying drawings to which reference is made for a complete understanding. In the drawings:

Figure 1 is a side elevation largely diagrammatic showing the general arrangement of the apparatus of our invention in relation to a sheet-processing machine such as a press;

Figures 2a and 2b together constitute a plan view of the apparatus shown in Figure 1 to an enlarged scale;

Figures 3a and 3b together constitute a side elevation of the pile supporting mechanisms and the conveyors associated therewith on a scale similar to that of Figure 2;

Figure 4 is a partial sectional view taken along the line IV—IV of Figure 3b;

Figure 4a is a partial end elevation with parts omitted;

Figure 5 is a partial plan view showing a modification wherein the pile-supporting mechanism is swingable out of normal position without necessitating the movement of the conveyor mechanism associated therewith;

Figure 6 is a partial elevation showing the hinge mounting the swinging pile supporting mechanism shown in Figure 5;

Figure 7 is a view of the structure of Figure 6 such as would be seen by looking on the latter from the right;

Figure 8 is a partial side elevation illustrating a modified mechanism whereby the sheets may be delivered alternately to one support and then to another;

Figure 9 is a view similar to Figure 8 showing a modification wherein the sheets are automatically diverted from one pile to another when the first pile has attained a predetermined height;

Figure 2B:
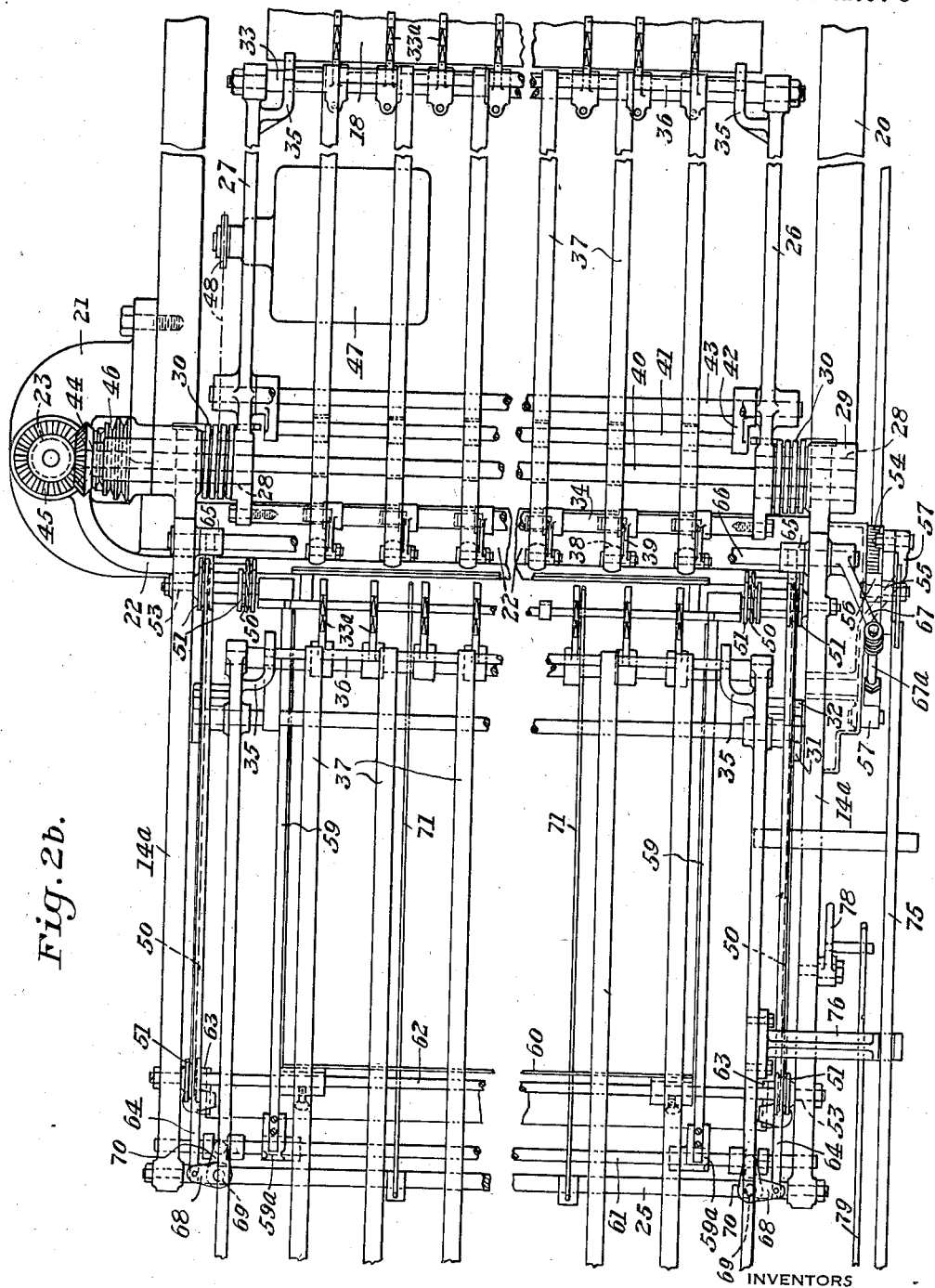

Referring now in detail to the drawings and for the present to Figure 1, pile-supporting mechanisms indicated generally at 10 and 11 are positioned to receive sheets successively from a processing machine such as a flat bed and cylinder press indicated generally at 12. The pile-supporting mechanisms comprise supporting standards 13a and 13b, side frames 14a and 14b, and bracing legs 15. A tiltable sheet conveyor 16 is pivoted to each pile-supporting mechanism as at 17 and is adapted to be raised, as indicated in dotted lines in Figure 1. The conveyor 16 of the pile-supporting mechanism nearest the press is adapted to receive sheets from the press cylinder indicated at 18 and deliver them either to a pile support 19, suspended on the supporting mechanism 10, or to the conveyor 16 of the mechanism 11. The latter delivers sheets to a support 19 carried thereby. A more detailed description of the various elements referred to follows hereafter, and reference is now made to Figures 2a, 2b, 3a, 3b, 4 and 4a.

The mechanisms 10 and 11 are substantially similar though not identical. The supports 13a of the mechanism 10, for example, are swingably mounted on the side frames 20 of the press 12 (although they may, alternatively, be fixed thereto), while the standards 13b of the mechanism 11 are adapted to rest on the floor. As shown in Figures 2b and 4a, the far side frame 20 of the press has hinge bearings 21 thereon, on which a cross girt 22 is swingably mounted on a hinge pin 23 fixed in the bearings 21. The side frames 14a of the mechanism 10 are secured by bolts 24 to flat faces projecting laterally from the girt 22 in planes parallel to those of the side frames 20. The side frames 14a are connected at their rear end by a tie bar 25.

The conveyor 16 of the mechanism 10 comprises side arms 26 and 27, pivoted on hinge pins 28 extending through sleeve bearings 29 formed integral with the side frames 14a. Counter-balance springs 30 reduce the manual effort necessary to tilt the side arms on the pins 28. The ends of the arms nearest the press have locking levers 31 adapted to engage abutments 32 on the side frames of the press (see Figures 1 and 4). The side arms 26 and 27 are connected by tie rods 33 and 34 at their ends nearest to and farthest from the cylinder 18, respectively. Strippers 33a are mounted on the rod 33 and cooperate with the press cylinder to strip a sheet therefrom when released by the usual cylinder grippers. Ears 35 extending inwardly from the side arms provide bearings for supporting a shaft 36. Conveyor belts or tapes 37 are trained around the shaft 36, and pulleys 38 carried on brackets 39 mounted on the rod 34. The tapes 37 are also trained about a driving shaft 40 and a tightener shaft 41, the latter being carried on brackets 42 swingable on a cross shaft 43. The drive shaft 40 is coaxial with the pins 28 and is rotatably supported in bearings carried by the latter. The shaft 40 extends through the pin 28 on the far side and is provided with a bevel pinion 44, meshing with a similar pinion 45 (see Figures 2b and 4a). The pinion 45 is secured to a shaft 40a journaled vertically in the upper end of the hinge pin 23, as illustrated in Figure 4a. The shaft 40a is driven through a similar bevel pinion drive 44a, 44b from a pulley 46 mounted on a shaft 46a journaled in a bracket 46b secured to the pin 23. The pulley 46 is driven by a motor 47 through a chain and sprocket 48 and a belt and pulley drive 49.

The pile support 19 of the mechanism 10 is suspended on cables 50 trained over pulleys 51 and wound on drums secured to a shaft 52. The pulleys 51 are journaled on stub shafts 53. Automatic lowering means for the support 19 include a ratchet wheel 54 and an oscillating crank 55 having a pawl 56 cooperating therewith. The details of this mechanism are illustrated in the copending application of Joseph Sinkovitz, Serial No. 144,607, but any convenient automatic lowering means may be employed. The crank 55 is oscillated by a reciprocating link 56, a bell crank 57 pivoted on the near standard 13a, and a link 58. The link 56 is actuated by cam or other means in timed relation to the operation of the press cylinder 18 (Fig. 1).

Side joggers 59 and a rear jogger 60 causes the sheets discharged onto the support 19 from the conveyor tapes to be piled neatly in a perpendicular pile. The side joggers are secured by brackets 59a to cross shafts 61 slidable in the side frame 14a. Each of the shafts 61 is composed of two parts connected by a spring-pressed telescoping joint (not shown). The rear jogger 60 is carried on a cross shaft 62, the ends of which are journaled in blocks 63 adjustably secured to links 64. The links 64 are reciprocated axially by cranks 65, secured to a cross shaft 66. The shaft 66 is oscillated by a crank 67 and a link 67a connected to the short arm of bell crank 57. The ends of the links 64 remote from the cranks 67 are pivoted to cranks 68 carried on vertical shafts 69. The shafts 69 are journaled in the tie bar 25 and are provided with cranks 70 pivoted to the shafts 61. Reciprocation of the links 64 causes the joggers 59 and 60 to move toward and away from the pile, thus maintaining each sheet as deposited in accurately superposed position relative to the sheets previously delivered. Bendable guide fingers 71 are secured to the tie bar 25. They normally extend forwardly therefrom to a point above the pulleys 38 when the conveyor of the adjacent supporting mechanism is raised. The function of the fingers 71 is to guide the sheets discharged from the conveyor tapes downwardly onto the pile carried on the support 19. The fingers of the mechanism 10 are pressed downwardly into the lower of their alternate positions illustrated, by the conveyor 16 of the mechanism 11 except when the latter is tilted up.

The pile-supporting mechanism 11 is similar in general to that already described in detail and corresponding parts thereof are designated by the same reference numerals. Numerous features of difference will be specifically referred to. The standards 13b are in the form of flat plates to which the depending portions of the side frames 14b are bolted. The hold-down latching levers 31 of the mechanism 11 cooperate with abutments 72 secured to the side frames 14a, as shown in Figs. 1 and 3b. This is the only mechanical connection between the mechanisms 10 and 11 so the latter may easily be removed for replacement or transfer to another machine. When the conveyor frame 16 of the mechanism 11 is in the position illustrated in Figures 3a and 3b, it forms, in effect, a continuation of the conveyor of the mechanism 10. The conveyor tapes of the mechanism 11 are driven by a motor 47a through a belt and pulley drive 49a. The motor 47a is controlled by a switch 73 mounted on the far side frame 14b. A projection 74 on the side arm 27 causes the switch to be closed when the conveyor frame is lowered to its illustrated position. When the frame is raised by releasing the levers 31 the switch 73 is opened and the motor 47a stops.

The crank 55 of the mechanism 11 is actuated by a link 75 having one end pivoted thereto. The other end of the link has a pin and slot connection to the crank 55 of the mechanism 10. A bell crank 57a is actuated by the link 58 and, in turn, operates link 68 which moves the joggers. The link 75 reciprocates through a stirrup 76 secured to the side arm 26. When the conveyor 16 of the mechanism 11 is uplifted the stirrup simply lifts the end of the link 75 off the pin in the crank 55. A latch bar 77, pivoted on the near side frame 14b, has a notch adapted to engage the projecting end of shaft 43a to hold the conveyor 16 in elevated position, as shown in Figure 1. Press throw-off levers 78 are pivoted on the inner side frames 14a and 14b and are connected by link 79 having a universal joint 80 therein. The lever 78 on the side frame 14a is connected by suitable means (not shown)

to a throw-off for the press 12. The end of the link 79 nearest the press is formed into a hook for cooperation with a pin on the adjacent lever 78. A bearing 81 supports the portion of the link between the rear lever 78 and the universal joint 80. A restoring spring 82 is disposed between the bearing 81 and a nut threaded on the link. The mechanism 11 is not mounted for swinging movement as is the mechanism 10.

Figures 5 through 9 illustrate a modification of an apparatus already described, wherein the side frames of the pile-supporting mechanism nearest the press and the pile support carried thereby may be swung laterally without moving the associated conveyor frame. This is in contrast with the structure of Figures 1 to 3a, wherein the conveyor of the mechanism 11 must be uplifted before the latter can be swung about the vertical pin 23 and the conveyor swings with the rest of the mechanism. The principal difference between the structure of Figures 5 to 7 and that already described in detail is that, in the former, the pins on which the conveyor frame is pivoted are not carried on the side frames of the pile-supporting mechanism. As clearly shown in Figures 5 through 7, bearing brackets 83 are carried on the side frames 20 of the press 12. Pins 28a are secured in bearing sleeves 84, formed on the brackets 83 and provide pivotal bearings for the side arms 26 and 27 of the conveyor frame. The bracket 83 on the far side overlies the girt 22 as shown in Figure 7. Screws 83a and 83b extend through the foot of said bracket and are threaded respectively into the side frame and the girt. Screws 83c and 83d extend through the near bracket, and are threaded respectively into the girt and side frame (see Figures 9-11).

Figures 6 and 7 illustrate clearly the cross girt 22 to which the side frames of the pile-supporting mechanism nearer the press cylinder are secured. The side frames of the modification shown in Figures 5 through 7 are designated by the numeral 85. As shown in dotted lines in Figure 5, the side frames 85 and the pile support carried thereon may be swung laterally without raising or otherwise moving the conveyor frame, after removing screws 83b and 83c. A pile which has accumulated on the supporting mechanism nearest the press may be removed while the conveyor associated with said mechanism remains effective to deliver sheets to a succeeding supporting mechanism. Removal may be facilitated by swinging the pile support out from under the conveyor frame but is possible without doing so. The conveyor may also be caused to swing with the rest of the mechanism by replacing screws 83b and 83c and removing screws 83a and 83d.

It will be apparent that when the screws 83a and 83d are in place, the bearing brackets 83 and 84 supporting the conveyor side arms 26 and 27 are secured to the side frames 20. When the screws 83b and 83c are in place, however, the bearing brackets 83 and 84 are secured to the cross girt 22.

Figure 8 illustrates a modification wherein the conveyor frame of the second pile-supporting mechanism is raised and lowered continuously in timed relation to the operation of the press, whereby one sheet is delivered to the first pile-supporting mechanism, the succeeding sheet to the next mechanism, etc. It will be understood that the number of pile-supporting mechanisms may be increased, as desired, above the two illustrated in the drawings and may be arranged otherwise than in tandem, if desired. As in the case of the modification of Figures 5 through 7, that shown in Figure 8 is similar, in general, to the apparatus shown in Figures 1 through 4. The following description, therefore, will be confined to the features which distinguish the particular modification shown in Figure 8 from the other forms of the invention.

Figure 8 shows in side elevation a pile support 86, arranged adjacent a press 87 and having a conveyor 88 extending through the latter. A second pile support (not shown), similar to 86 except that it is supported in about the same manner as the mechanism of Figure 1, has a conveyor 89 extending over the supporting mechanism 86. The conveyor 88 is adapted to deliver sheets received from the press cylinder either to the pile support 90 of the mechanism 86, or to the conveyor 89. The conveyor 89 is adapted to be raised and lowered automatically between the delivery of successive sheets from the press. For this purpose, the latching levers 31 are held out of operative position (i. e., in the dotted line position) by pivoted fingers 89a. A link 91 has a fork formed at its upper end for engagement with a pin 92 extending laterally from the near side arm of the conveyor 89. The link 91 is pivoted to a lever 93, mounted on the near side frame 94 of the press 87 for angular movement thereon. The lever 93 is oscillated by means of a link 95 and a crank 96 carried on a shaft 97. The shaft 97 is journaled in the near side frame 94 and is driven in timed relation to the operation of the press by a chain and sprocket drive 98. Oscillation of the lever 93 causes reciprocation of the link 91. This causes the conveyor to tilt up and down, pivoting on its pins 28 (not shown). When the conveyor 89 is raised, the conveyor 88 delivers a sheet to the pile support 90. When the conveyor 89 is lowered it receives a sheet discharged by the conveyor 88 and delivers it to the pile support of the mechanism with which the conveyor 89 is associated. It is thus possible to deliver alternate sheets to different piles.

The jogger-operating mechanism shown in Figure 8 differs slightly from that of Figures 1 through 4. The bell crank 57 is actuated in the same manner and causes reciprocation of a link 67b corresponding to the link 61a. The link 67b through a crank 67', oscillates a shaft 66 and cranks 65a carried thereby. These cranks operate the jogger mechanism in the same manner as the cranks 65 of Figure 3b.

A lever 99 is pivoted on the side frame 94 at 100. Its lower end has a pivotal connection with the link 56. Its upper end has a pin cooperating with the slotted end of link 75. The press throw-off lever 78a of Figure 8 differs slightly in arrangement from lever 78 of Figures 3a and 3b but corresponds thereto in operation and function.

Figure 11:
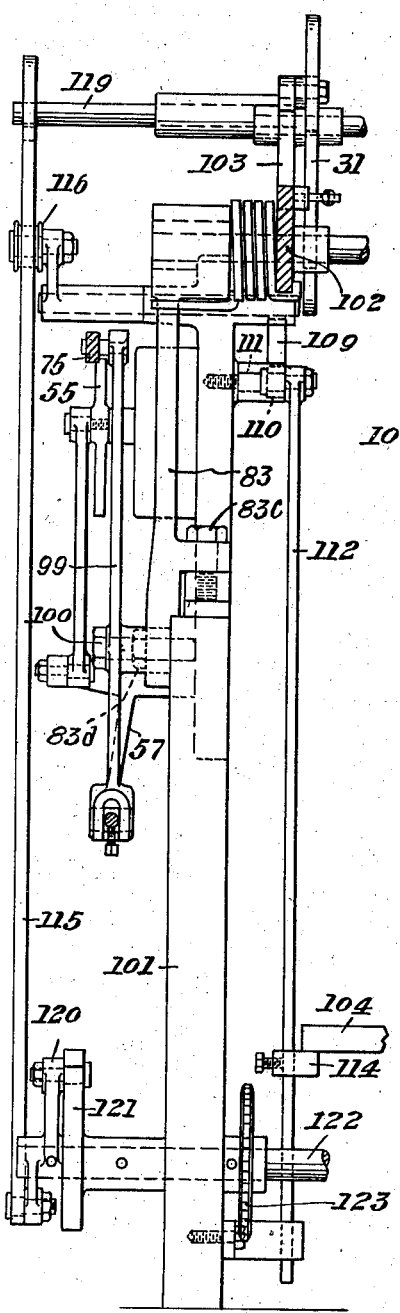
Figure 11 is a partial end elevation of the apparatus of Figure 9 such as would be seen by looking on the latter from the right.
Figure 10:
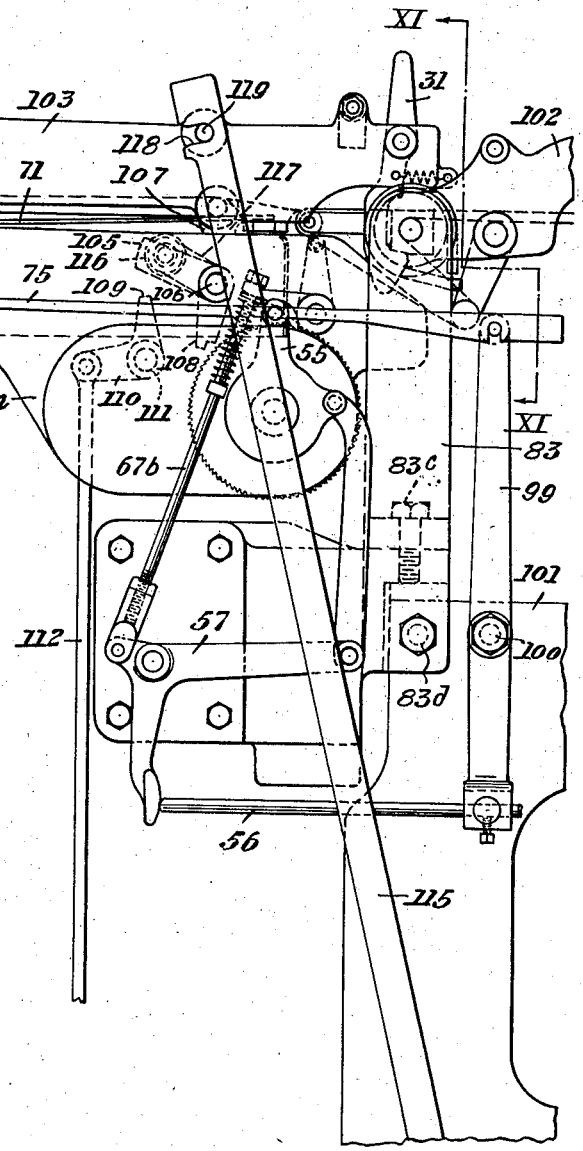
Figure 10 is a view similar to Figure 9 showing parts in an alternative position.

Figures 9 through 11 illustrate a further modification including means for automatically causing the sheets being delivered to be diverted from the first pile-supporting mechanism to the second when the pile on the former has reached a predetermined height.

As shown in the drawings, a pile-supporting mechanism 100a is disposed adjacent a press, the side frames of which are shown at 101, and is provided with a conveyor 102. The second pile-supporting mechanism (not shown) has a conveyor 103. The latter is shown in elevated position in Figure 9, so that sheets discharged by the conveyor 102 build up in a pile on a support 104, suspended from the mechanism 100a. The conveyor 103, however, is adapted to be automatically lowered by means to be described shortly, whereupon the latching levers 31 become effective to hold the conveyor in its lowermost position.

The conveyor 103 is normally held in elevated position by a finger 105 extending radially of a shaft 106. The finger 105 bears against a boss 107 on the near side arm of the conveyor 103. The shaft 106 is journaled in the near side frame of the mechanism 100a. The finger 105 is normally held erect by cooperating detents 108 and 109. The former is carried on the shaft 106. The latter forms part of a bell crank 110 pivoted on the near side frame of the mechanism 100a at 111. A link 112 is pivoted to the bell crank 110 and extends downwardly through the support 104 and a guide bearing 113 extending from the near press frame 101. A set collar 114 is adjustable along the link 112. As a result, when the support 104 has been lowered sufficiently to engage the collar 114, the link 112 is pulled down on further lowering of the support. The support is automatically lowered by oscillating crank 55 and the ratchet and pawl mechanism operated thereby, as in the form of the invention first described.

As the link 112 is pulled down, the detent 109 disengages the detent 108. The shaft 106 is normally urged in counter-clockwise direction by a suitable coil spring (not shown) so that when the detent 109 disengages the detent 108 the finger 105 swings to the position shown in Figure 10, thus permitting downward movement of the conveyor 103.

Means for positively tilting the conveyor to its lowermost position include a link 115 which normally bears against a roller 116 mounted on a crank 117 extending from the shaft 106. The link 115 has a notch 118 adjacent its upper end adapted to cooperate with a pin 119, extending laterally from the near side arm of the conveyor 103. The link 115 is pivotally connected at its lower end to a bell crank 120 pivoted to the near side frame 101. The crank 120 is actuated by a cam 121 mounted on a shaft 122 extending through the near side frame. A chain and sprocket drive 123 drives a shaft 122 in timed relation to the operation of the press.

With the parts in the positions illustrated in Figure 9 the link 115 merely reciprocates idly as the shaft 122 rotates. When the detents 108 and 109 have shifted to the positions shown in Figure 10, the link 115 is no longer held away from the pin 119 by the roller 116. Counter-clockwise tilting movement of the link 115 causes the pin 119 to be engaged by the slot 118 on the next upward movement of the link. When the link reverses, the conveyor 103 is pulled down to the position shown in Figure 1, whereupon the latching levers 31 become effective to lock the conveyor in that position.

From the foregoing detailed description it will be seen that the invention provides means for expeditiously handling sheets discharged successively by a processing machine of any kind, a typical example of which is a flat bed and cylinder press. Perhaps the principal advantage of the invention is that it permits the removal of a pole of sheets which has accumulated on one supporting mechanism without necessitating the stoppage of the flow of sheets. A pile of sheets delivered to the mechanism 10 of Figures 1 through 4 may be removed after lowering the conveyor 16 to the position shown in solid lines in Figure 1, so that sheets delivered from the press while the pile of the mechanism 10 is being removed are delivered to the support 19 of the mechanism 11. This operation may be facilitated (in the form of the invention shown in Figures 5-7) by swinging the mechanism on its hinge pin 21 without moving the associated conveyor 16. A substantial increase in the production obtainable from a press or other processing machine can thus be achieved, since the time for unloading piles amounts to from 5 to 10% of the total running time. As before stated, the number of pile supporting mechanisms may be increased beyond the two illustrated and described herein. The invention also permits sheets to be delivered alternately to one pile and then to another and also the automatic shifting of the delivery from one pile to another when the former has built up to a predetermined height.

The conveyors of the pile-supporting mechanisms are driven by separate motors. In case of a shut-down of the press in an emergency or the like the last sheet discharged from the press is not stopped in its path, but is carried to the pile by the continued operation of the conveyor-driving motors. The switch automatically controlling the motor driving the conveyor of the second pile-supporting mechanism causes the conveyor to be driven only when it is actually in position to receive the sheets. The conveyor of the second mechanism, furthermore, may be shifted from inoperative position to operative position without stopping the delivery of sheets, since the movement may be accomplished between the delivery of the successive sheets. Similarly, the delivery of sheets to the second supporting mechanism may be arrested simply by lifting its conveyor. This permits easy inspection of the following sheets which are delivered to the first supporting mechanism. On releasing the latching levers 31, the mechanism nearest the press can be swung away from the latter to give access to the inking mechanism or the bed of the press (not shown). Since the conveyor drive includes bevel gearing coaxial with the hinge pin, it remains operative at all times. Swinging of the mechanism merely causes bevel gears 45 and 44b to rotate as gears 44 and 44a traverse orbital paths about the shaft 40a.

Although we have illustrated herein only a preferred embodiment of the invention and a few modifications, it will be understood that changes in the construction and operation disclosed may be made without departing from the spirit of the invention or the scope of the appended claims.

We claim:

1. Apparatus for receiving and stacking sheets fed successively along a predetermined path, comprising a plurality of pile supports disposed along said path, a sheet conveyor extending laterally of each support, said conveyors being capable of being so positioned as to constitute a substantially continuous conveying means effective to carry sheets to the last support along said path, and means mounting at least one of said supports for swinging movement about a vertical axis relative to the conveyor extending therefrom, without affecting continuous travel of sheets along said conveyors successively.

2. Apparatus for receiving and stacking sheets fed successively, comprising a plurality of conveyors adapted to be so positioned as to constitute a substantially continuous conveying mechanism, a plurality of supports associated with said conveyors to which sheets may be delivered, at least one of said conveyors being movable whereby to divert sheets from the support with which the movable conveyor is associated to the support associated with the conveyor next preceding in the path of the sheets, and independent driving means for said conveyors so that said movable conveyor need not be running when not operative.

3. Sheet-handling mechanism, comprising a frame having means carried thereon for supporting a pile of sheets, a conveyor extending from one side of said frame laterally of said means to receive sheets and deliver them to said means, a second pile-supporting means disposed under said conveyor, means adapted to deliver sheets to said last mentioned means and to said conveyor, said conveyor being movable into and out of sheet-receiving position, means for driving said conveyor, and means actuated by movement of the conveyor into sheet-receiving position for starting said driving means.

4. Sheet-handling mechanism, comprising a plurality of conveyors disposed in alinement, each conveyor comprising a frame tiltable about a horizontal axis adjacent one end and endless conveyor elements traversing said frame, said conveyors when alined constituting a substantially continuous conveying mechanism such that sheets traveling thereon are fully visible for inspection, and means disposed beyond each conveyor and below the adjacent conveyor, if any, for receiving sheets from each conveyor when the adjacent conveyor is tilted out of sheet-receiving position.

5. Sheet delivery apparatus comprising a mechanism including a frame, a pile support suspended thereon, and a conveyor extending laterally from the frame, a second similar mechanism on the side of said first-mentioned frame opposite that from which the conveyor extends, said second mechanism also having a pile support suspended thereon and a conveyor extending laterally therefrom across the first-mentioned mechanism and into adjacency with the conveyor of said first-mentioned mechanism whereby to receive sheets therefrom, and manually releasable means securing the conveyor of said second mechanism to the frame of the first mentioned mechanism whereby the second mechanism and its conveyor may be readily detached from said first-mentioned frame.

6. Apparatus for receiving and stacking sheets fed successively, comprising a plurality of conveyors adapted to be so positioned as to constitute a substantially continuous conveying mechanism, a plurality of supports associated with said conveyors to which sheets may be delivered, and means actuated by the building up of a pile of a predetermined height on one of said supports, effective to move at least one of said conveyors to cause delivery of sheets to another support.

7. The apparatus defined by claim 1 characterized by means for connecting said one of said supports and its conveyor for simultaneous swinging movement about said axis.

8. Apparatus for receiving and stacking sheets fed successively, comprising a plurality of conveyors adapted to be so positioned as to constitute a substantially continuous conveying mechanism and a plurality of supports associated with said conveyors to which sheets may be delivered, the apparatus having connections including means operated by the top of the pile so constructed and arranged as to become effective when the height of the pile of sheets delivered to one support exceeds a predetermined level to move at least one of said conveyors to cause delivery of sheets to another support.

9. Apparatus for delivering successively fed articles to a plurality of supporting means, comprising a plurality of article supporting means, delivery means for delivering successively fed articles to desired supporting means including a conveyor shiftable selectively to inoperative position and to operative article delivery position determining to which article supporting means a delivered article passes, means for driving said conveyor, and connections so constructed and arranged as to become operative upon shifting of the conveyor to operative position for starting said driving means.

10. Apparatus for delivering successively fed articles to a plurality of supporting means, comprising a plurality of article supporting means, delivery means for delivering successively fed articles to desired supporting means and means for progressively moving at least one of said supporting means during operation of the apparatus upon the feeding of articles thereto, the apparatus having connections so constructed and arranged as to become effective upon a predetermined movement of said movable supporting means to cause operation of said delivery means to deliver a subsequently fed article to another supporting means.

11. In combination with means for acting upon and successively discharging articles, apparatus for delivering the successively discharged articles to a plurality of supporting means, comprising a plurality of article supporting means and delivery means for delivering successively discharged articles to desired supporting means, the apparatus having driving means which continue in operation after stoppage of the driving means for said first-mentioned means whereby to insure completion of delivery of articles which may be partially delivered upon stoppage of said first mentioned means.

12. Apparatus for delivering articles fed successively thereto to a plurality of supporting means, comprising a plurality of article supporting means and delivery means for delivering articles fed successively to the apparatus to desired supporting means, the apparatus having control means operable by one of the article supporting means so constructed and arranged as to become effective when the quantity of such articles delivered to such supporting means exceeds a predetermined quantity and means operated by said control means to cause operation of said delivery means to deliver a subsequently fed article to another supporting means.

13. Delivery mechanism for transferring successively discharged sheets from a press or the like to a plurality of supporting means, the delivery mechanism comprising a plurality of sheet supporting means and delivery means for delivering successively fed sheets to desired supporting means, the delivery mechanism having driving means which continue in operation after stoppage of the driving means for the press or the like whereby to insure completion of delivery of sheets which may be partially delivered upon stoppage of the press or the like.

14. In combination with a printing or like couple for printing or similarly acting upon and successively discharging sheets, sheet delivery apparatus for delivering the successively discharged sheets to a plurality of pile supports, comprising a plurality of pile supports and delivery means for delivering successively discharged sheets to desired pile supports, the apparatus having driving means which continue in operation after stoppage of the driving means for the couple whereby to insure completion of delivery of sheets which may be partially delivered upon stoppage of said couple.

JOSEPH SINKOVITZ.
JOHN KUNZ.